United States Patent [19]
Sun et al.

[11] Patent Number: 6,020,691
[45] Date of Patent: Feb. 1, 2000

[54] DRIVING CIRCUIT FOR HIGH INTENSITY DISCHARGE LAMP ELECTRONIC BALLAST

[75] Inventors: Yiyoung Sun, Beverly; Takeshi Goriki, Burlington, both of Mass.

[73] Assignee: Matsushita Electric Works R & D Laboratory, Inc., Woburn, Mass.

[21] Appl. No.: 09/302,269

[22] Filed: Apr. 30, 1999

[51] Int. Cl.$^7$ ...................................................... G05F 1/00
[52] U.S. Cl. .................... 315/307; 315/244; 315/209 R; 315/DIG. 5; 315/DIG. 7
[58] Field of Search .................. 315/307, 244, 315/291, 209 R, 224, 308, DIG. 5, DIG. 7

[56] References Cited

U.S. PATENT DOCUMENTS

| | | | |
|---|---|---|---|
| 4,904,907 | 2/1990 | Allison et al. | 315/307 |
| 4,912,374 | 3/1990 | Nagase et al. | 315/244 |
| 5,428,268 | 6/1995 | Melis et al. | 315/247 |
| 5,491,386 | 2/1996 | Eriguchi et al. | 315/209 R |

*Primary Examiner*—Haissa Philogene
*Attorney, Agent, or Firm*—Greenblum & Bernstein, P.L.C.

[57] ABSTRACT

A circuit arrangement and control thereof for igniting a high intensity discharge (HID) lamp, for reducing the high frequency ripple superimposed on the low frequency rectangular waveform lamp current after ignition, and for increased circuit efficiency. The high frequency ignition voltage is only applied to the lamp during ignition phase and is mainly generated by the second stage of the low pass (LP) filter. The first stage of the LP filter whose resonant frequency is below the second stage further attenuates the high frequency ripple current through the lamp in normal operation. The resulting lamp current is a low frequency rectangular wave with less than 10% high frequency ripple. Acoustic resonance is avoided. The inductor in the first stage of LP filter is operated in discontinuous current mode. Doing so, the active switches are in zero current switching (ZCS) to maximize the circuit efficiency.

35 Claims, 10 Drawing Sheets

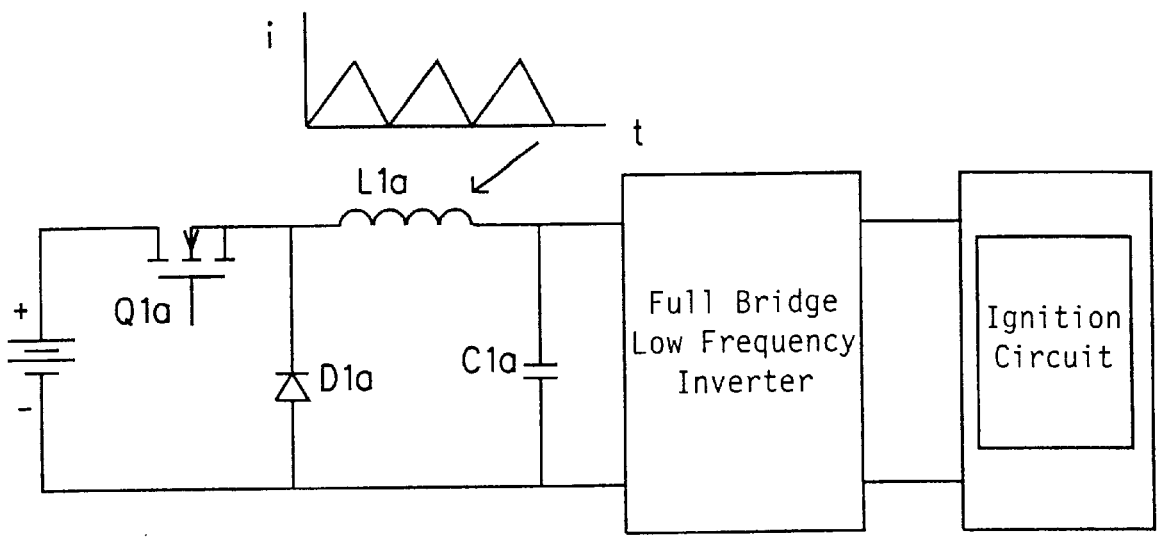
FIG. 1 : PRIOR ART
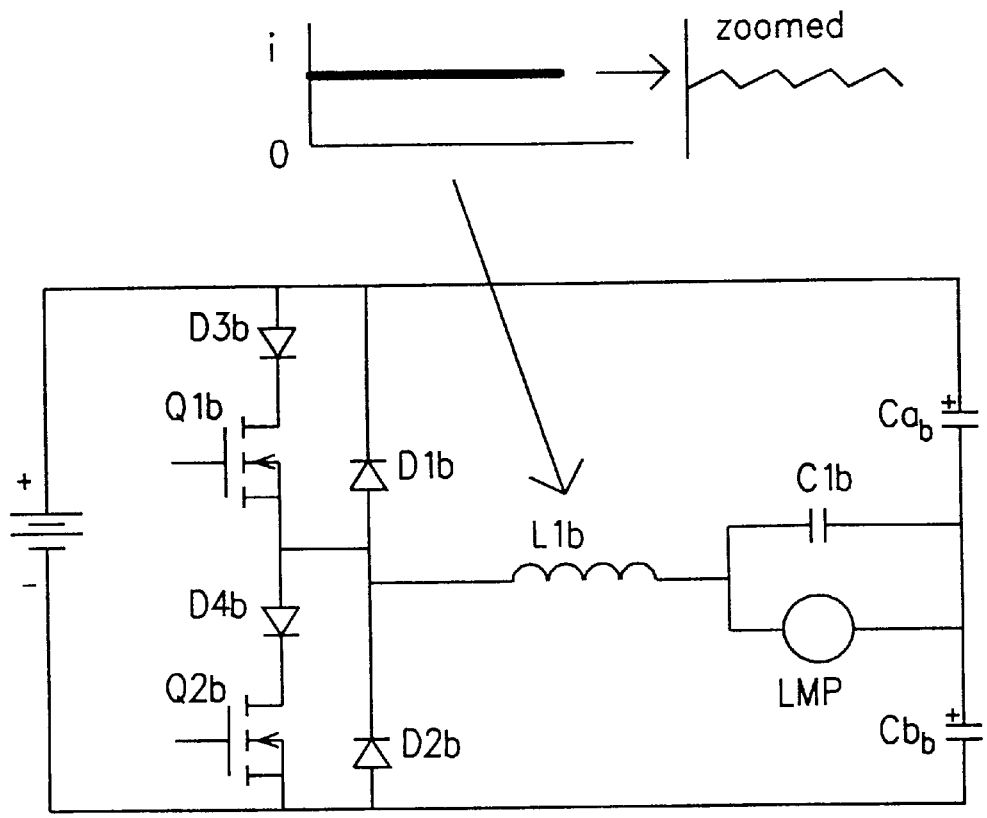
FIG. 2: PRIOR ART

500mA / Div

1mS / Div

10mA / Div

20uS / Div

DRIVING CIRCUIT FOR HIGH INTENSITY DISCHARGE LAMP ELECTRONIC BALLAST

BACKGROUND OF THE INVENTION

1. Field of the Invention

The present invention relates to a circuit arrangement and control method for generating high frequency sinusoidal voltage for igniting a high intensity discharge (HID) lamp, and for maintaining stable lamp arc operation with minimal high frequency ripple superimposed on a low frequency rectangular lamp current.

2. Description of Background Information

In electronic high intensity discharge lamp ballasts, there are two distinctly different methods to drive the lamp. The first method is to drive the lamp with high frequency sinusoidal current, and the second is to drive the lamp with low frequency rectangular current. The high frequency sinusoidal current method tends to give rise to acoustic resonance. Accordingly, low frequency rectangular current wave operation remains the favored technique for electronic high intensity discharge lamp ballasts because of the acoustic resonance problem associated with the high frequency method.

Two fundamental approaches are generally taken to generate a low frequency (less than 1 KHz) rectangular current with very small high frequency ripple to the lamp, as shown in comparative examples in FIGS. 1 and 2. FIG. 1 shows a buck power regulator with pulse ignition in discontinuous inductor current mode, including switching element Q1a, inductor L1a, diode D1a and capacitor C1a. In this case, the current in the inductor L1a has very large triangular high frequency ripple.

U.S. Pat. No. 5,428,268 to Melis et al., issued Jun. 27, 1995, describes one implementation substantially corresponding to the example of FIG. 1. As shown in FIG. 5A of Melis et al., the average part of the inductor current goes to the lamp, while the AC part of the inductor current is filtered by a capacitor C20 across the lamp. The patent to Melis et al. includes no specific mention of the actual values of capacitance C20 and inductance L20. However, to sufficiently filter the AC high frequency current to be below an acceptable level, and to maintain discontinuous mode operation for switching efficiency, the capacitance C20 has to be very large and the inductance L20 has to be quite small. The characteristic impedance of the circuit is low because of the large value of capacitance C20 and small value of inductance L20. It is known that the resonant voltage can be approximated by the characteristic impedance multiplied by the resonant current. Accordingly, generation of a high ignition voltage using the resonant method necessarily suffers from high circulating resonant current in the resonant elements and driving source switches. Practically, for an example of C=0.47 $\mu$F, L=890 $\mu$H, and Vp=3 kV$_{peak}$, the resonant current will be an implausible 69 A$_{peak}$. Obviously, the pulse method as disclosed in Melis et al. is the only logical method to ignite the lamp for the circuit arrangement and for the mode of operation disclosed therein.

The disadvantages of pulse mode ignition are clearly explained in commonly assigned U.S. patent application Ser. No. 08/783,557, filed Jan. 14, 1997, inventor(s) Ajay Maheshwari et al. FIG. 2 of the present application shows a comparative example of a buck power regulator with high frequency resonant ignition, similar to that of U.S. application Ser. No. 08/783,557, and with continuous inductor current mode. Shown in FIG. 2 are switches Q1b, Q2b; diodes D1b–D4b, inductor L1b, and capacitors C1b, Ca$_b$, and Cb$_b$. In this case, the current in the inductor L1b has a very small triangular high frequency ripple superimposed on the low frequency rectangular current. Both the average part of the inductor current and the AC part of the inductor current flow through the lamp LMP. The parallel capacitor C1b with small capacitance is present only for the purpose of generating ignition voltage, and the burden of filtering the high frequency ripple is almost entirely on the inductor L1b. The disadvantages of this arrangement become apparent when it is considered that the high frequency attenuation is only –20 dB/decade (logarithmic decade) for frequencies above the corner frequency (the corner frequency being formed by the lamp LMP impedance and the inductance L1b). To achieve ripples low enough to avoid any acoustic resonance problems, the physical size of the inductor L1b, and the inductance itself, must be fairly large. A side effect of large inductance is an increased glow-to-arc transition time. Another disadvantage of this arrangement is that the switching elements Q1b, Q2b are in hard switching mode during the switch turn-on interval. The necessary switches are expensive because external ultra-fast freewheeling diodes in the order of 20–50 nS reverse recovery time are required. Moreover, switching losses are relatively high.

U.S. Pat. No. 4,904,907 to Allison et al., issued Feb. 27, 1990, discloses a modification of the continuous mode operation discussed above, in which (as shown in FIG. 5 of Allison et al.) an LC parallel resonant network (part of T301 and C304, C305 combination) is inserted into the buck inductor (part of T301). The inserted LC parallel resonant network has a resonant frequency at the buck operating frequency, and the fundamental frequency of the buck power regulator is attenuated significantly. A drawback of the circuit of Allison et al. is that the attenuation factor is highly sensitive to the frequency variation of the buck converter.

For example, the impedance of an LC parallel network can be calculated as $$Z_p(w) = |wLp/\{1 - (w/wp)^2\}| \qquad (1)$$

where wp is the parallel LC resonant frequency. The impedance at 1% and 3% deviation from the resonant frequency is $Z_p$ (1.01 wp)=50.2 and $Z_p$(1.03 wp)=16.9, respectively. It can been seen that a 2-percentage point variation in the operating frequency will cause the attenuation impedance to vary by a factor of 3, which in turn will cause the high frequency ripple to be attenuated by almost the same factor.

In the above mentioned two patent disclosures (U.S. Pat. Nos. 5,428,268 and 4,904,907), two stages of conversion are required to regulate the power and to supply a rectangular current to the lamp. The first stage regulates the lamp power and limits the current in the lamp during warm-up phase. The high frequency ripple is also attenuated by the filters in the first stage. The second stage is a full bridge inverter that takes the DC output from the buck regulator and converts the DC output to a low frequency rectangular current (AC) for the lamp. A pulse ignition circuit is invariably required to ignite the lamp.

U.S. Pat. No. 4,912,374 to Nagase et al., issued Mar. 27, 1990, discloses a high frequency resonant ignition technique, although such is not the primary subject matter of this patent and is not specifically mentioned therein. In this topology, e.g., FIGS. 1 and 3 of Nagase et al., the power control stage and the inverter stage are combined in a half bridge/full bridge topology. The power control stage is combined with the output inverter, and in order to prevent acoustic resonance, the output inductor L1 and the capacitor C1 across the lamp must provide sufficient filtering to keep the high frequency component of the lamp current to a minimum. Consequently, the capacitance C1 is large, in the order of 1/10 micro-farads ($\mu F$). When this scheme is operated at high frequency and the lamp is off, the resonant circuit formed by the inductor and capacitor produces a high voltage to ignite the lamp. Very large circulating current flows in the circuit because of the large capacitance value and the relatively smaller inductance value. When the lamp is in high frequency operation, high frequency current is produced in the lamp. During the low frequency mode, the switching pattern is changed to one that would control the lamp power and limit the lamp current. Fundamentally, the disclosure of Nagase et al. has the same disadvantages as the comparative example of FIG. 1 of the present disclosure in discontinuous mode operation, except that resonant ignition is implied.

SUMMARY OF THE INVENTION

An object of the present invention is to overcome the drawbacks of the prior art, e.g., the need for high circulating current for resonant ignition; hard switching in continuous current mode; ripple sensitivity to the operating frequency; and the use of pulse ignition.

Another object of the invention is to provide a high intensity discharge (HID) lamp current with less than approximately 10% high frequency ripple superimposed on the low frequency rectangular current waveform.

Yet another object of the invention is to provide a pair or pairs of switching elements with soft switching, preferably zero current switching (ZCS), during switch turn-on, yet maintaining continuous current in the current source inductor, where the current source inductor is directly in series with the high intensity discharge lamp, and where the lamp is in parallel with an ignition capacitor having a low capacitance.

Zero current switching (ZCS) is less costly than external ultra-fast freewheeling diodes and has lower switching losses.

Still another object of the invention is to generate high frequency ignition voltage mainly by the higher frequency resonant point of the dual-LP (Low Pass) resonant network, or the second stage resonant point, yet keeping the high frequency ripple content attenuated by the lower frequency resonant point of the dual-LP resonant network, or the first stage resonant point.

Still yet another object of the invention is to control the sweeping frequency during ignition phase around the second stage resonant point.

A further object of the invention is to control the normal operating frequency to be significantly above both resonant points.

According to one aspect of the present invention, a discharge lamp driving circuit includes DC voltage input connections for powering the discharge lamp driving circuit, and two lamp-driving connections between which the high intensity discharge lamp is connectible. A bridge circuit, including high/low frequency driver control circuitry connected to drive switching elements thereof, is connected to the DC voltage input connection. To aid glow-to-arc transition, the lamp connected between the lamp driving connections is ignited by an alternating sinusoidal voltage biased by an alternating rectangular voltage during starting. A filter network includes two or more filter stages each of which is cascaded to the lamp driving connections and to the switching elements of the bridge circuit. The filter network removes acoustic resonance in the lamp during normal operation by filtering alternating rectangular current driving the lamp.

To aid glow-to-arc transition, the high/low frequency driver control circuitry may ignite the lamp by an alternating sinusoidal voltage no less than approximately 16 KHz, biased by the alternating rectangular voltage during starting. Optionally, to aid glow-to-arc transition, the high/low frequency driver control circuitry ignites the lamp by an alternating sinusoidal voltage no less than approximately 20 KHz, biased by an alternating rectangular voltage during starting, further optionally by an alternating sinusoidal voltage from 40 to 60 KHz.

Optionally, the alternating rectangular voltage no greater than approximately 1 KHz, further optionally is no greater than approximately 200 Hz, and still further optionally is from 25 to 200 Hz. Optionally, the alternating rectangular current is no greater than approximately 1 KHz. Further optionally, the alternating rectangular current is no greater than approximately 400 Hz. Still further optionally, the alternating rectangular current is approximately 100–300 Hz.

In one preferred construction, the bridge circuit includes a first arm and a second arm and the lamp driving connections include a first lamp driving connection and a second lamp driving connection. The filter stages form a tank circuit including a first filter stage and a second filter stage. The first filter stage includes a resonant circuit having a first stage inductor and a first stage capacitor, and the second filter stage includes a resonant circuit having a second stage inductor and a second stage capacitor. The first stage inductor is connected between the first arm of the bridge circuit and a first common junction where the first stage capacitor and the second stage inductor are joined, while the first stage capacitor is connected between the first common junction and the second arm of the bridge circuit. The second stage inductor is connected between the first common junction and a second common junction where the first lamp driving connection and the second stage capacitor are joined, while the second stage capacitor is connected between the second common junction and the second arm of the bridge circuit. The second lamp driving connection is connected to the second arm of the bridge circuit.

In this case, a second resonant frequency formed by the second stage inductor and the second stage capacitor is preferably higher than a first resonant frequency formed by the first stage inductor and the first stage capacitor. Further, the capacitance of the first stage capacitor is optionally approximately no less than 10 times the capacitance of the second stage capacitor, further optionally approximately 10–200 times, and still further optionally approximately 15–50 times. The inductance of the second stage inductor is optionally no less than approximately 5 times the inductance of first stage inductor, and further optionally approximately 5–100 times the inductance of the first stage inductor, and still further optionally approximately 10–20 times the inductance of the first stage inductor. Accordingly, high frequency ignition voltage is generated mainly by the higher frequency resonant point of the dual-LP resonant network, yet the high frequency ripple content is kept attenuated by the lower frequency resonant point of the dual-LP resonant network.

In one preferred arrangement, the first stage inductor operates in one of discontinuous current mode and critical discontinuous current mode during normal operation after starting. In another preferred arrangement, the second stage inductor operates in continuous current mode during normal operation after starting.

A switching frequency of the bridge circuit during normal operation is optionally no less than approximately 10 KHz higher than the first resonant frequency formed by the first stage inductor and the first stage capacitor, and above the second resonant frequency formed by the second stage inductor and the second stage capacitor, and optionally 10–80 KHz higher than the first resonant frequency. Further optionally, the switching frequency may be 20–60 KHz higher than the first resonant frequency. In this manner, the normal operating frequency is controlled to be significantly above both resonant points.

Optionally, the switching elements operate in zero current switching mode during normal operation, and/or in resonant mode during starting. Optionally, the current source inductor should be directly in series with the high intensity discharge lamp and the lamp should be in parallel with an ignition capacitor of no less than approximately 0.5 nano-farads, and further optionally approximately 0.5–10 nF, and still further optionally approximately 1–3 nF. This arrangement improves performance when the switching elements have soft switching or ZCS switching during switch turn-on, yet maintain continuous current in the current source inductor. Further optionally, the switching elements are in half bridge configuration or in full bridge configuration.

The control circuitry is connected to sweep the frequency of AC ignition voltage during starting through a range that includes the second resonant frequency formed by the second stage inductor and the second stage capacitor. This arrangement helps in avoiding excessive current and voltage imposed on the second stage resonant elements.

The control circuitry is preferably connected to generate a fixed frequency of AC ignition voltage during starting above the second resonant frequency formed by the second stage inductor and the second stage capacitor. In this manner, the sweeping frequency is controlled during ignition phase around the second stage resonant point.

The control circuitry may also be optionally connected to sweep the frequency of AC voltage during starting through a range having a lower end no less than approximately 5 KHz higher than the first resonant frequency formed by the first stage inductor and the first stage capacitor, further optionally approximately 5 KHz to 25 KHz higher than the first resonant frequency, and still further optionally approximately 10 KHZ to 15 KHz higher than the first resonant frequency. This arrangement avoids excessive current and voltage imposed on the first stage resonant elements and switching elements.

BRIEF DESCRIPTION OF THE DRAWINGS

The present invention is further explained in the description which follows with reference to the drawings, illustrating, by way of non-limiting examples, various embodiments of the invention, with like reference numerals representing similar parts throughout the several views, and wherein:

FIG. 1 shows a block diagram of an prior art example of the discontinuous current mode high intensity discharge lamp ballast;

FIG. 2 shows a block diagram of an prior art example of the continuous current mode high intensity discharge lamp ballast;

DETAILED DESCRIPTION OF THE EMBODIMENTS

Figure 3:
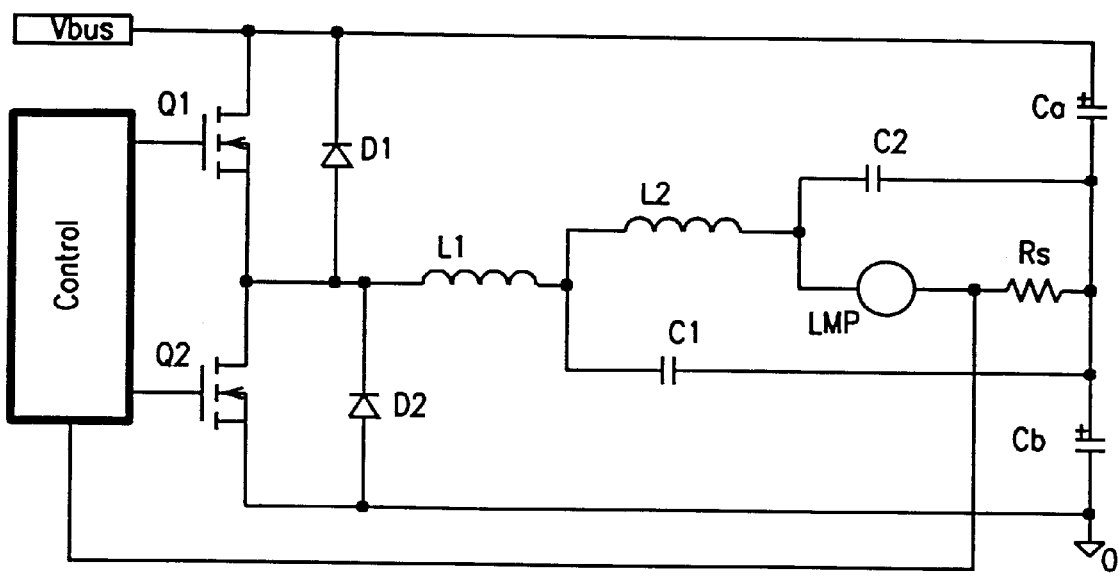
FIG. 3 shows a basic schematic diagram of a preferred embodiment of the present invention.

It should be noted that hereinafter, "inductor" and "inductance" are used interchangeably, as are "capacitor" and "capacitance." Reference characters for inductors refer to either the inductor itself or its inductance value, and reference characters for capacitors refer to the capacitor itself or its capacitance value.

Figure 4:
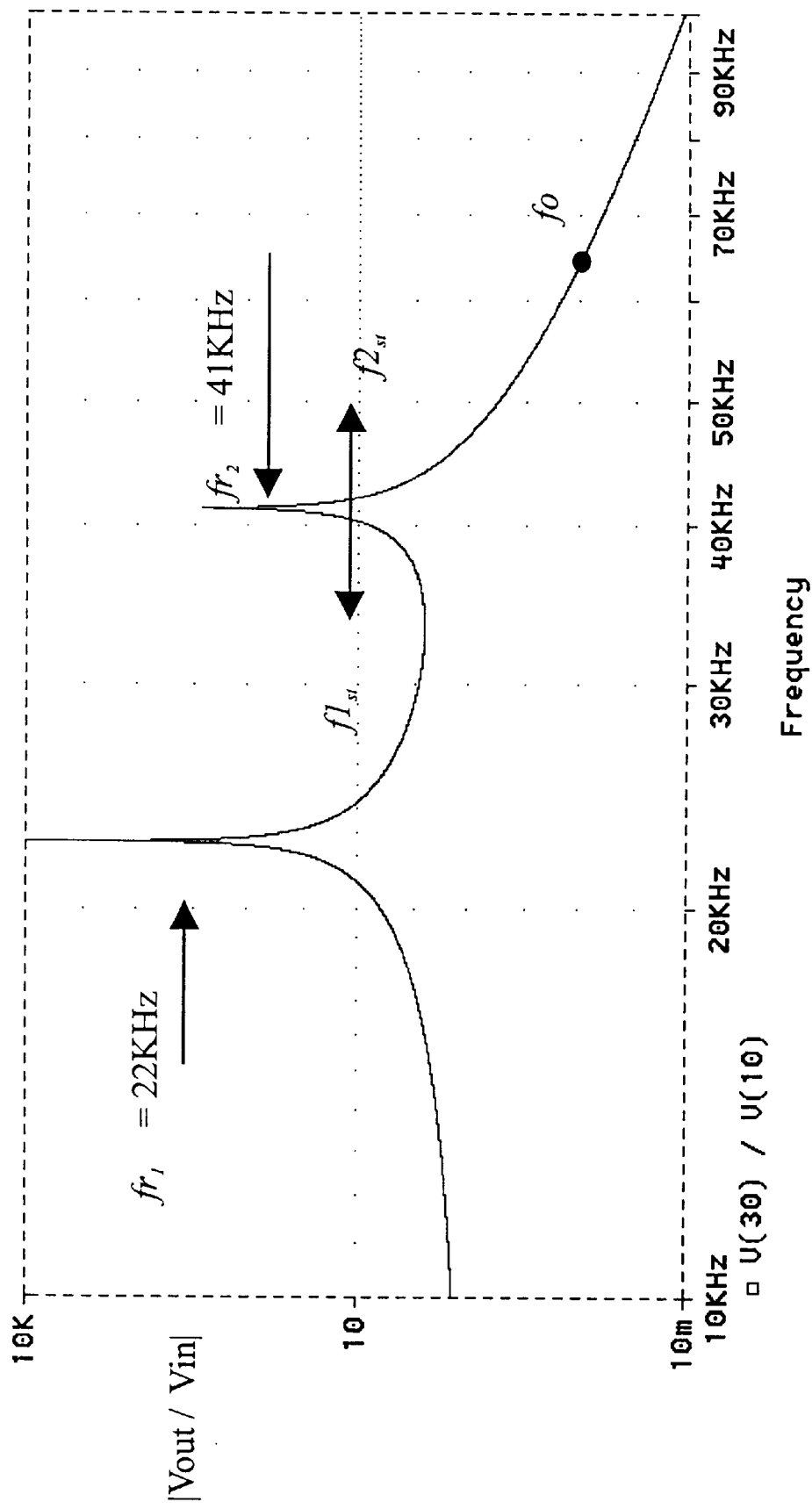
FIG. 4 shows the electrical characteristics in frequency domain of the embodiment of FIG. 3.

FIG. 3 shows the circuit arrangement of a preferred embodiment of the present invention. FIG. 4 shows the frequency characteristics of the circuit of FIG. 3. As shown in FIG. 3, the discharge lamp driving circuit includes DC voltage input connections in the form of a DC voltage source Vbus. The DC voltage source Vbus comes either from a power factor correction circuit or directly from a rectified and filtered AC line without power factor correction.

A multi-stage filter network includes a tank circuit connected to a first lamp driving connection and a second lamp driving connection of a high intensity discharge lamp LMP. The tank circuit includes at least two resonant circuits, a first stage resonant circuit (low pass filter) and a second stage resonant circuit (low pass filter). Preferably, a second resonant frequency, formed by a second stage inductance L2 and a second stage capacitance C2, is higher than a first resonant frequency, formed by a first stage inductance L1 and a first stage capacitance C1, as described hereinafter.

As shown in FIG. 3, the first stage inductance L1 and the first stage capacitance C1 are the first stage of a dual-stage low pass (LP) filter (or tank circuit). The second stage inductance L2 and the second stage capacitance C2 are the second stage of the dual-stage low-pass (LP) filter. The second stage inductance L2 and the second stage capacitance C2 are connected to the first lamp driving connection (i.e., at the junction of LMP, L2, and C2). The first stage inductance L1 is connected to a first arm of bridge circuitry (a bridge circuit, described below), while the first stage capacitance C1 and the second stage capacitance C2 are connected to the second arm of the bridge circuitry. The second lamp driving connection is also connected to the second arm of the bridge circuitry via a detecting resistor Rs. Rs is optionally approximately 0.1 to 0.4 Ω. The first stage capacitance C1, the second stage inductance L2, and the first stage inductance L1 are connected together to form a common junction. The bridge circuitry is connected to the DC voltage input connections (Vbus) and to the multi-stage filter network (or tank circuit).

Capacitors Ca and Cb are energy storage elements. Capacitance of the energy storage elements (capacitors) Ca and Cb is selected to be quite large (e.g., about 100 µF electrolytic capacitor for 70 W output power) so that the voltage at the junction point with reference to ground (0) is almost constant, with a small amount of low frequency triangular ripple superimposed thereon. Ca and Cb are optionally equal, and optionally within the range of approximately 47 µF to 220 µF.

The bridge circuitry (bridge circuit) includes high/low frequency (dual functional) driver control circuitry connected to drive a first switching elements Q1 and a second switching element Q2. The first and second switching elements Q1 and Q2 (in the embodiment NMOS MOSFETs with substrate shorted to source) form a half bridge circuit. In an alternative topological arrangement (shown in FIGS. 14A and 14B, and discussed below), the energy storage elements Ca and Cb can be replaced by a pair of active switches (such as MOSFETs), in which case a full bridge scheme is formed in conjunction with the first switching element Q1 and the second switching element Q2. Accordingly, the switching elements Q1 and Q2 may be either in half bridge configuration or in full bridge configuration.

Diodes D1 and/or D2 carry freewheeling current after switching element second switching element Q2 or first switching element Q1 turns off, respectively. That is, when switching element Q2 turns off, the diode D1 carries freewheeling current until switching element Q2 turns on again, and when switching element Q1 turns off, the diode D2 carries freewheeling current until the switching element Q1 turns on again. It should be noted that high speed MOSFETs may include integrated high-speed diodes that carry the freewheeling current, and if the switching elements Q1 and Q2 are of this type, then the diodes D1 and D2 would not be required in the circuit.

During startup, the first and second switching elements Q1 and Q2 are high frequency resonant switches that turn on and off alternatively in every half of a low frequency cycle. For example, in the first half cycle of a low frequency voltage cycle (e.g., in the embodiment, a cycle of approximately 200 Hz), the first switching element Q1 may turn on at an 80% duty cycle sweeping from 50 KHz to 30 KHz and back to 50 KHz, or from 30 KHz to 50 KHz and back to 30 KHz, while the second switching element Q2 may turn on at a duty cycle of (100–80)%, or 20%. In the next half of the low frequency voltage cycle, the first switching element Q1 may turn on at a 20% duty cycle sweeping from 50 KHz to 30 KHz and back to 50 KHz, or from 30 KHz to 50 KHz and back to 30 KHz, while the second switching element Q2 may turn on at a duty cycle of (100–20)%, or 80%. Usually, to generate ignition peak voltage between 2500V and 3000V specified by lamp manufacturers, the duty ratio is about 75% to 95% depending on the component tolerances of C1, C2, L1, and L2. The actual duty ratio on each ballast is adjusted manually to satisfy the peak ignition voltage. The nature of the frequency sweep is solely for the purposes of generating the ignition voltage and easing the glow-to-arc transition. Multiple sweeping is entirely possible in half of a low frequency cycle. That is, the sweeping from a first frequency to a second frequency and back to the first frequency may be performed more than once (multiple sweeping) in half of a low frequency voltage duty cycle.

In normal operation, the first switching element Q1 turns on while the second switching element Q2 is completely off in a first half of a low frequency current cycle, and the second switching element Q2 turns on while the first switching element Q1 is completely off in the next half of a low frequency current cycle. Sealing off one of the switching elements Q1 or Q2 is necessary to avoid any current flow after the freewheeling current reaches zero. If the switching elements Q1 or Q2 were to operate in resonant mode during normal operation, the first stage inductance L1 would not be in the desired ZCS mode, and the current ripple increases.

That is, the switching elements Q1 and Q2 operate in zero current switching (ZCS) mode during normal operation to maximize efficiency. However, during starting, the switching elements Q1 and Q2 operate in resonant mode to generate ignition voltage across the second stage capacitance C2.

The duty cycle is controlled by feedback signals to the control unit 1 (e.g., control circuitry). The sensed lamp current, in association with the sensing resistor Rs and the lamp voltage, are fed back to control the on or off state of the first switching element Q1 and the second switching element Q2.

As noted above, the DC voltage source Vbus comes from either a power factor correction circuit or directly from a rectified and filtered AC line.

In a starting or ignition mode, the operating frequency is repetitively swept from a lowest sweeping frequency $f1_{st}$ to a highest sweeping frequency $f2_{st}$ and then from the highest sweeping frequency $f2_{st}$ to the lowest sweeping frequency $f1_{st}$. To avoid excessive high current load on the first stage of the LP filter during this mode of operation, a first (lower) resonant frequency $fr_1$, which has a value of:

$$fr_1 = 1/2 * \pi * \sqrt{L1 * C1}$$

is chosen below and away from the lowest sweeping frequency $f1_{st}$. For example, if the lowest sweeping frequency $f1_{st}$ is 30 KHz, then the first resonant frequency $fr_1$ may be selected at about 22 KHz.

During normal operation, however, the switching frequency of the bridge circuitry is significantly higher than the first resonant frequency $fr_1$ formed by the first stage inductance L1 and the first stage capacitance C1 and a second resonant frequency $fr_2$ formed by the second stage inductance L2 and the second stage capacitance C2. For example, if the second resonant frequency $fr_2$ is 40 KHz, then the switching frequency of the bridge circuitry can be approximately 70 KHz.

To avoid excessive high voltage across the first stage capacitance C1, characteristic impedance Z1 of the first stage of the LP filter, which has a value of:

$$Z1 = \sqrt{L1/C1}$$

is chosen to be low by the selection of the first stage inductance L1 and the first stage capacitance C1. For a first resonant frequency $fr_1$ of 22 KHz, the characteristic impedance Z1 of the first stage filter is about 70 Ω.

However, unlike the selection of the first stage inductance L1 and the first stage capacitance C1 for a low characteristic impedance Z1 of the first stage, a characteristic impedance Z2 of the second stage of the LP filter is chosen to be high to maximize the ignition voltage across the lamp LMP.

The characteristic impedance Z2 of the second stage has a value of:

$$Z2 = \sqrt{L2/C2}$$

For $fr_2$ of 40 KHz, the characteristic impedance Z2 of the second stage filter is about 1800 Ω. In order to maximize the ignition voltage across the lamp LMP, the second stage capacitance C2 is to be as small as possible and the second stage inductance L2 is to be as large as possible, as long as lamp glow-to-arc transition time does not deteriorate. For example, the second stage capacitance C2 is optionally a few (e.g., approximately 0.5 to 10) nano-farads (nF), while the second stage inductance L2 is optionally several (e.g., approximately 2 to 20) milli-henries (mH). In one working example, the second stage capacitance C2 is about 1–3 nF (actually 2.2 nF), and the second stage inductance L2 is about 7 mH. If the second stage capacitance C2 is too high, it is difficult to generate sufficient ignition voltage. If the second stage inductance L2 is too high, the glow-to-arc transition time is too long.

Accordingly, the first stage capacitance C1 is higher in value than the second stage capacitance C2, and the first stage inductance L1 is much lower in value than the second stage inductance L2. The first stage capacitance C1 may be no less than approximately 10 times the second stage capacitance C2, optionally approximately 10–200 times the second stage capacitance C2, and further optionally, about 15–50 times the second stage capacitance C2. In one working example (discussed below), the first stage capacitance C1 is about 45 times the second stage capacitance C2. The second stage inductance L2 may be no less than 5 times the first stage inductance L1, optionally about 5–100 times the first stage inductance L1, and further optionally, about 10–20 times the first stage inductance L1. In one working example (discussed below), the second stage inductance L2 is about 14 times the first stage inductance L1.

It should be noted that the relationship between resonant frequency and corresponding capacitance and inductance of a filter stage is inverse square-root, and a relatively large change in capacitance or inductance is needed to have a meaningful change in resonant frequency. In general, in optimizing a design, if the capacitance in a stage of the two-stage filter is increased, the corresponding inductance is decreased.

The control circuitry is connected to sweep the frequency of the AC ignition voltage (during starting) through a range that includes the second resonant frequency $fr_2$ formed by the second stage inductance L2 and the second stage capacitance C2, depending upon the AC ignition voltage level (during starting) required. The control circuitry may also be connected to generate a fixed frequency of the AC voltage (during starting) near the second resonant frequency $fr_2$ formed by the second stage inductance L2 and the second stage capacitance C2.

The control circuitry is also connected to sweep the frequency of the AC voltage during starting through a range far away from the first resonant frequency $fr_1$ formed by the first stage inductance L1 and the first stage capacitance C1. For example, as previously noted, if the first resonant frequency $fr_1$ is about 22 KHz, the lowest sweeping frequency $fl_{st}$ may be approximately 30 KHz.

That is, the first stage resonant point $fr_1$ is set at lower frequency than the second stage LP filter network. Moreover, the lowest sweeping frequency $fl_{st}$ is set to be much higher than the first stage resonant point $fr_1$ to avoid excessive current and voltage imposed on the first stage resonant elements and switching elements. Optionally, the lowest sweeping frequency $fl_{st}$ is set to be no less than approximately 5 KHz higher than the first stage resonant point $fr_1$. In this regard, if the lowest sweeping frequency is too high, it is difficult to generate sufficient ignition voltage. Further optionally, the lowest sweeping frequency is approximately 5 KHz to 25 KHz higher than the first stage resonant point $fr_1$. Still further optionally, the lowest sweeping frequency is approximately 10–15 KHz higher than the first stage resonant point $fr_1$. Further, the frequency sweeping rate is preferably also selected to avoid excessive current and voltage imposed on the second stage resonant elements.

Figure 11:
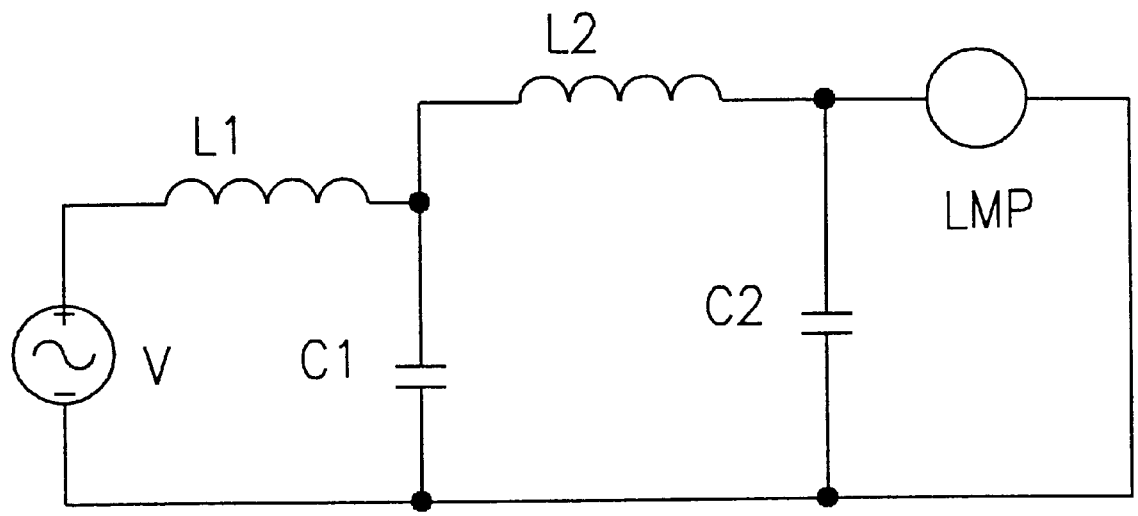
FIG. 11 shows a simplified equivalent circuit of the dual-low pass filter in FIG. 3.
Figure 12:
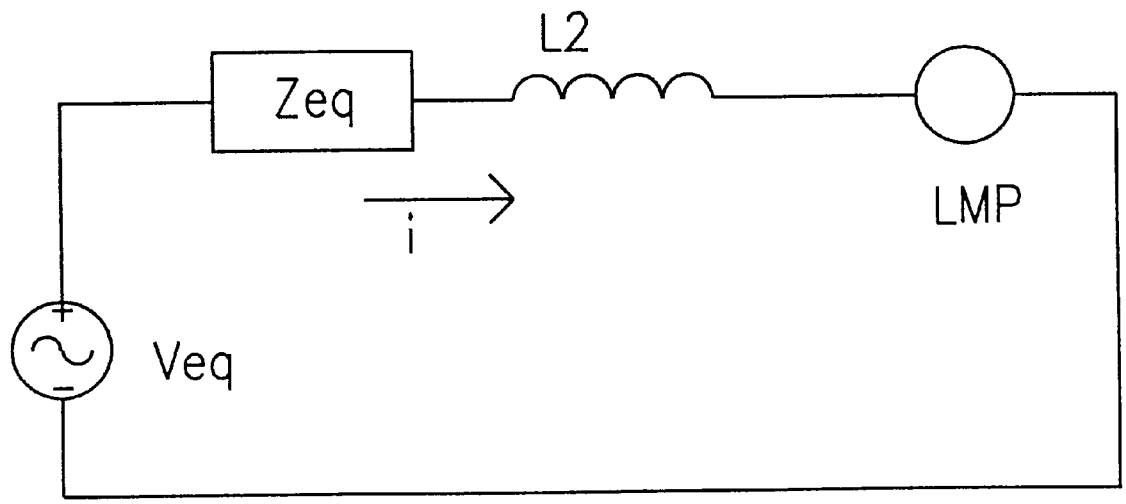
FIG. 12 shows the Norton conversion of FIG. 11.

For the high frequency ripple analysis in normal operation, the basic schematic diagram in FIG. 3 can be simplified as shown in FIGS. 11 and 12. It should be noted that in FIG. 11, parasitic loss elements are ignored. FIG. 12 is a Norton conversion from FIG. 11. As was analyzed for starting or ignition, the second stage capacitance C2 is relatively small, e.g., but optionally no less than approximately 0.5 nano-farads (nF), for the purpose of generating high ignition voltage. The high frequency ripple current can then be considered to be flowing through the lamp LMP only. This assumption can be verified by comparing the lamp LMP impedance and the impedance of the second stage capacitance C2 at an operating frequency fO. A 70 W metal halide lamp has an impedance of about 120 Ω. At fO=65 KHz, the impedance of a 2.2 nF capacitor (as in the working example discussed below) is approximately 1113 Ω. The ripple current can be written as follows (fundamental frequency approximation):

$$i = \frac{v}{j2\pi foL1 + (j2\pi foL2 + LMP) * \left(1 - \left(\frac{fo}{fr_1}\right)^2\right)}$$

where j is the square root of −1, fO is the operating (or switching) frequency, LAP is the lamp impedance, and v is the RMS value of fundamental frequency component.

The last term in parenthesis, $(1-(fO/fr_1)^2)$, is the impedance amplification factor. The operating frequency fO is chosen to be no less than approximately 10 KHz higher than the first resonance frequency $fr_1$, and is optionally approximately 10 KHz to 80 KHz higher than the first resonance frequency $fr_1$ (further optionally, 20–60 KHz higher). Comparing with the single stage LP filter, where, e.g., the first stage inductance would be L1=0 and the amplification factor is 1, the dual-stage LP filter of the embodiment gives high frequency ripple attenuation significantly better than the single stage LP filtering circuit.

Another feature of this embodiment of the invention is that the operation mode of selected energy storage elements, e.g., the first stage inductance L1 and the second stage inductance L2, differs. The first stage inductance L1 is in discontinuous current mode operation, while the second stage inductance L2 is in continuous current mode operation. More specifically, the first stage inductance L1 operates in discontinuous current mode or in critical discontinuous current mode during normal operation after starting, while the second stage inductance L2 operates in continuous current mode during normal operation after starting.

Figure 9:
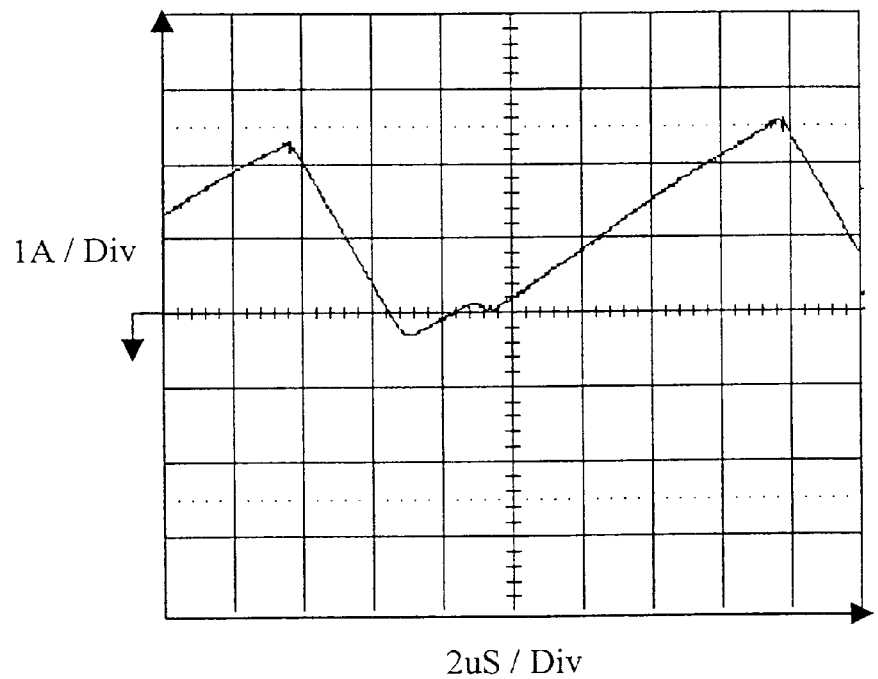
FIG. 9 shows the discontinuous operation of a first stage inductance L1.
Figure 10:
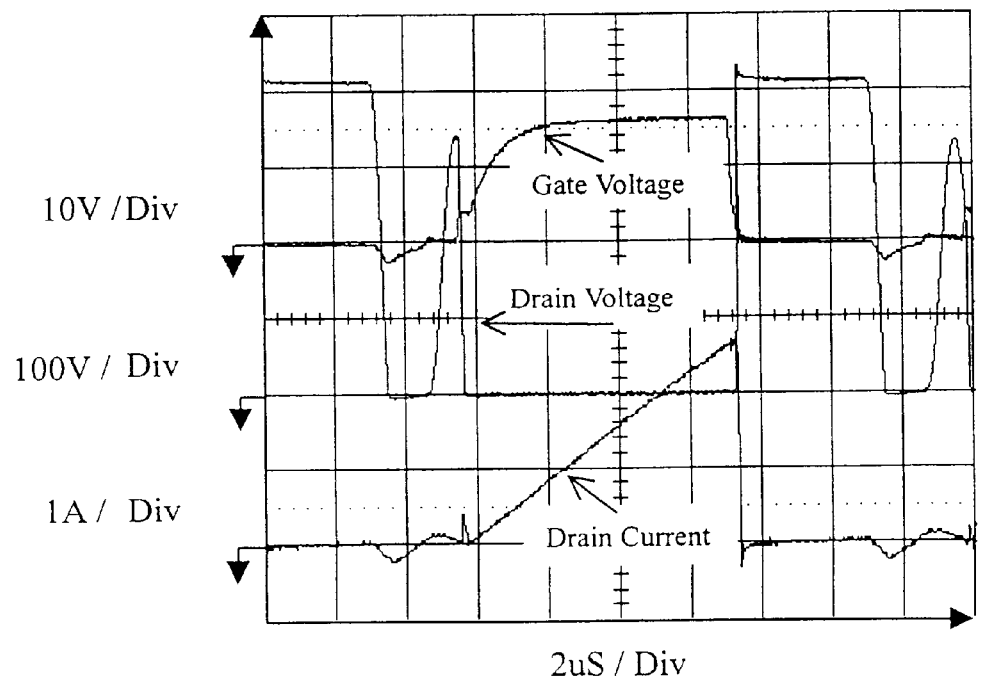
FIG. 10 shows the typical measured zero current switching during switch turn-on in switching elements Q1 or Q2.
Figure 13:
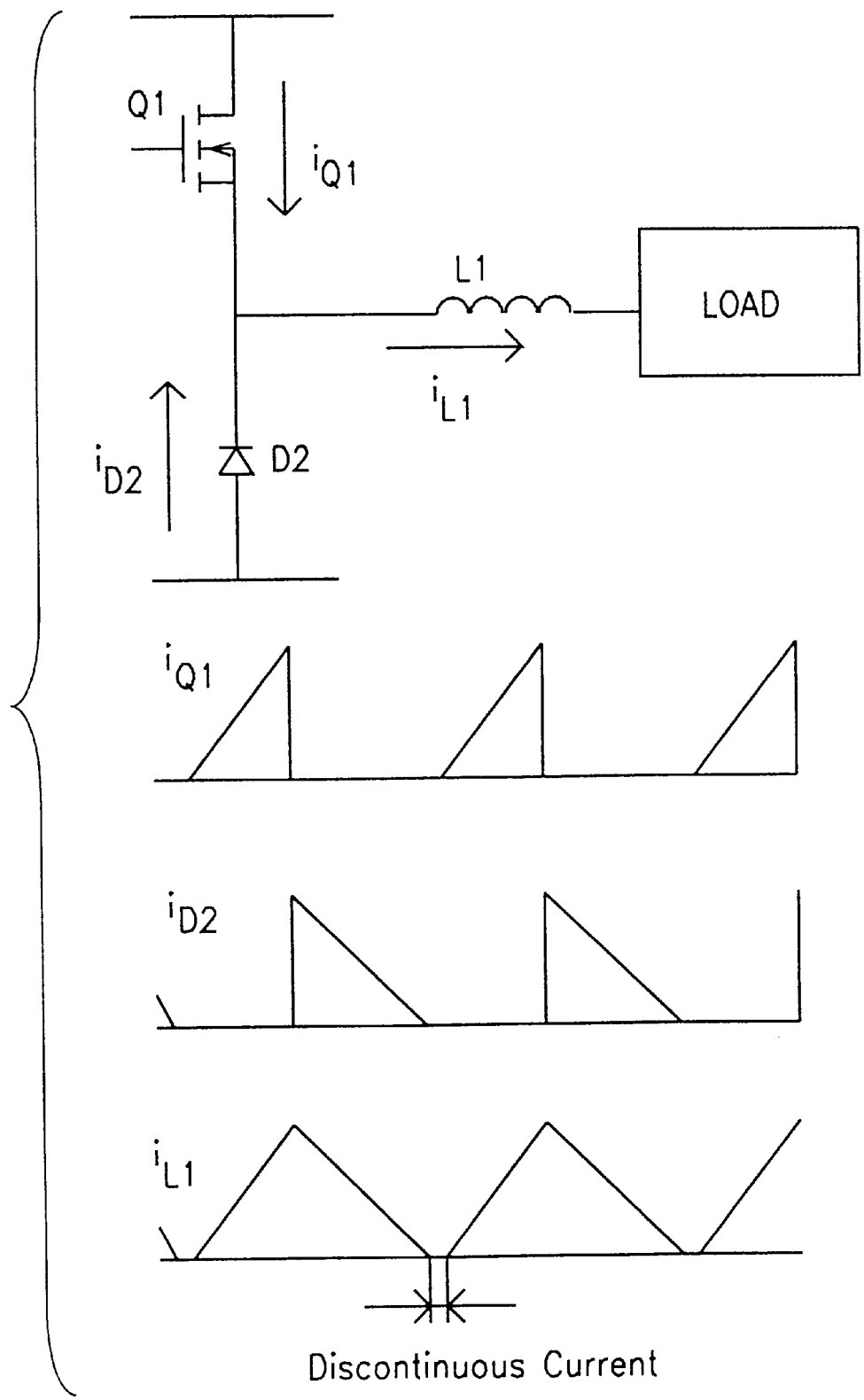
FIG. 13 explains the waveforms for ZCS and discontinuous current mode operation.

The advantage of discontinuous current operation of the first stage inductance L1 can be explained as follows, with reference to FIG. 13. When the first switching element Q1 is on, the current ramps up to a set level determined by the feedback loop. Subsequently, the first switching element Q1 becomes turned off, and a first stage inductance (L1) current $i_{L1}$ can not change abruptly. The first stage inductance current $i_{L1}$ continues to flow through an internal diode of the second switching element Q2 (if the second switching element Q2 is a MOSFET) or the external diode D2, until the inductor current $i_{L1}$ reaches zero, at or after which point, the first switching element Q1 turns on again. The current of the first switching element Q1 starts to ramp up from the zero level. This mode of the first switching element Q1 operation is called zero current switching (ZCS). The same is true for the second switching element Q2 when the second switching element Q2 is in active switching. Ideally, ZCS at turn-on will have zero losses during the switching turn-on interval, and the efficiency of the circuit is therefore improved. As discussed below with reference to a particular working example, FIG. 9 shows the discontinuous operation of the first stage inductance L1, while FIG. 10 shows the zero current switching of the first and second switching elements Q1,Q2.

An advantage of continuous current operation of the second stage inductance L2 of FIG. 3 is that the capacitor (second stage capacitance C2) across the lamp LMP is primarily for the purpose of generating ignition voltage, not for filtering the high frequency ripple (as in the single stage discontinuous mode operation of the prior art). The combination effect of both stages of the present invention generates an approximately −60 dB/decade (logarithmic frequency scale) attenuation at the operating frequency and thereby filters the high frequency ripple, without considering the second stage capacitance C2. A small value of second stage capacitance C2 is preferably selected since a large value of capacitance across the lamp LMP shortens the life of the lamp. That is, for rectangular current wave ballast, the life is shortened with a large capacitance because the lamp receives a large discharge current from the capacitor across the lamp during lamp voltage transition. As discussed above, a small value of second stage capacitance C2, optionally no less than approximately 0.5 nano-farads (nF), is selected (preferably, C2 is from 0.5–10 nF, further optionally 1–3 nF, and in the working example, is 2.2 nF).

To further clarify how the first and the second stage LP filters are designed, experimental results for a working example of a 70 W metal halide lamp ballast are given herein. A Philips metal halide lamp CDM70/U/M was used in the working example. The working example is for the purposes of demonstrating the efficacy of the invention only, and is not intended to limit the scope of the claims. In the working example, the actual values used to generate the results in FIGS. 4 through 9 are: L1 of 0.5 mH, L2 of 7 mH, C1 of 0.1 µF, C2 of 2.2 nF, Ca and Cb equal at 68 µF, Q1 and Q2 were Mitsubishi FK10KM-12 MOSFETs, D1 and D2 were not used (e.g., high-speed MOSFETs Q1 and Q2, incorporating diodes, were used). The lamp LMP impedance is approximately 120 Ω for 70 W metal halide lamps.

FIG. 4 is a frequency domain plot, where the resonant frequencies, $fr_1$ and $fr_2$, ignition sweeping frequencies, $fl_{st}$ and $f2_{st}$, and operating frequency f0 are shown. As shown in FIG. 4, with the lamp CDM70/U/M, the first (lower) resonant frequency $fr_1$ is approximately 22 KHz, the upper resonant frequency $fr_2$ is approximately 41 KHz, ignition sweeps between frequencies $fl_{st}$ and $f2_{st}$ (between approximately 35 KHz and 50 KHz), and the operating frequency f0 is approximately 65 KHz.

Figure 5:
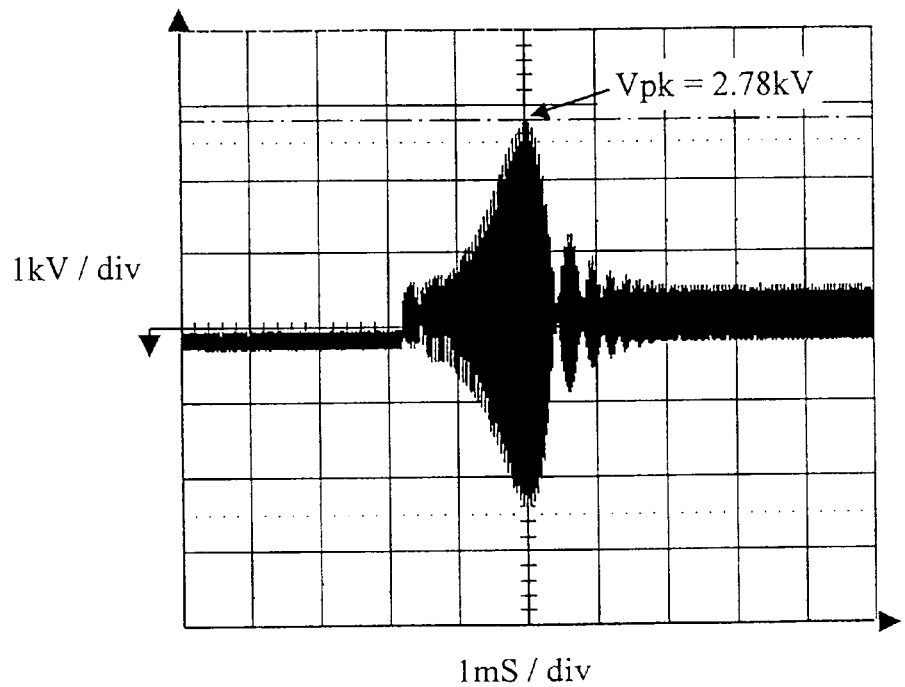
FIG. 5 shows the high frequency ignition voltage envelope generated by the second stage of the dual-LP filter circuit.

FIG. 5 shows the measured high frequency ignition voltage envelope across the second stage capacitance C2, primarily generated by the second stage of the dual-LP filter circuit. It should be noted that to aid glow-to-arc transition, this high frequency ignition voltage is biased by a low frequency rectangular voltage. As shown in FIG. 5, the peak value Vpk of the measured high frequency ignition voltage envelope across the second stage capacitance C2 is about 2780 volts, which is within the suitable range for ignition of the lamp LMP.

Figure 6:
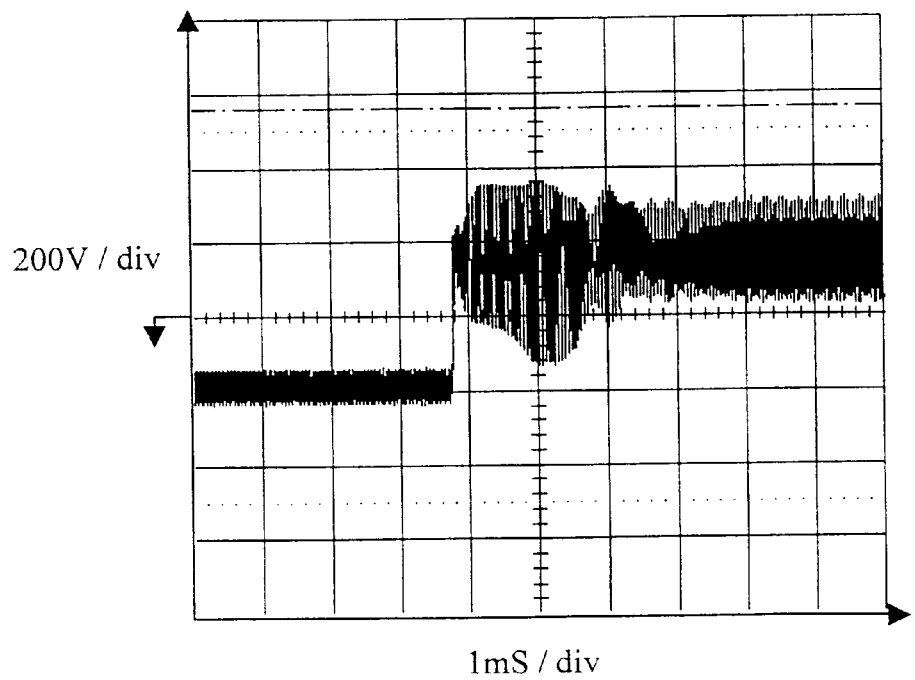
FIG. 6 shows the first stage output voltage envelope during ignition phase.

FIG. 6 shows the first stage output voltage envelope across the first stage capacitance C1 during the ignition phase (starting). As shown in FIG. 6, the peak of the voltage across the first stage capacitance C1 during the ignition phase is less than approximately 400V, which is not excessively high.

Figure 7:
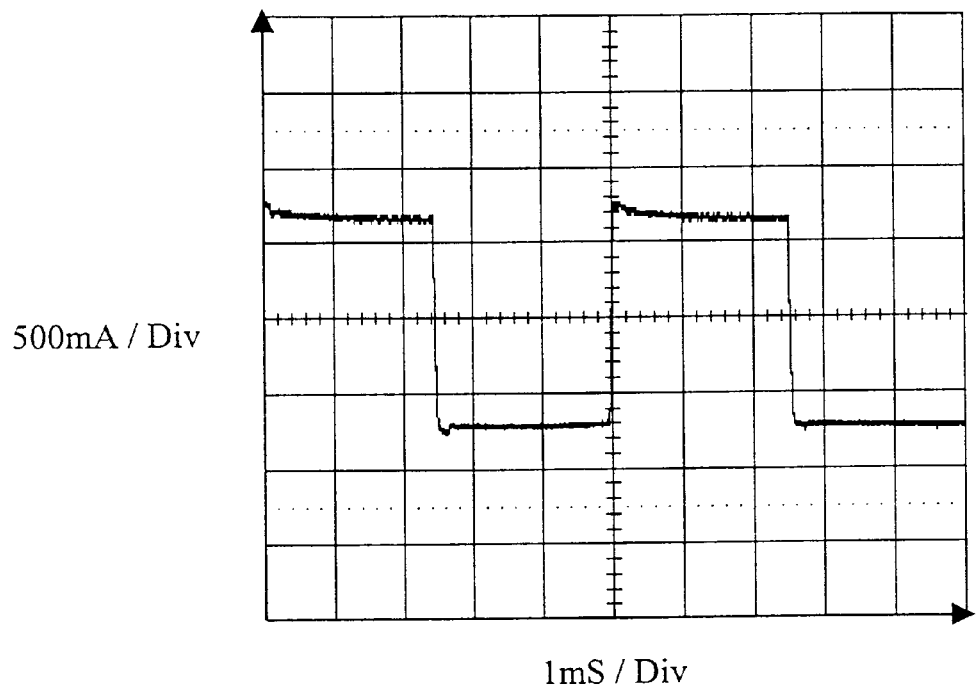
FIG. 7 shows the rectangular lamp current in normal operation.
Figure 8:
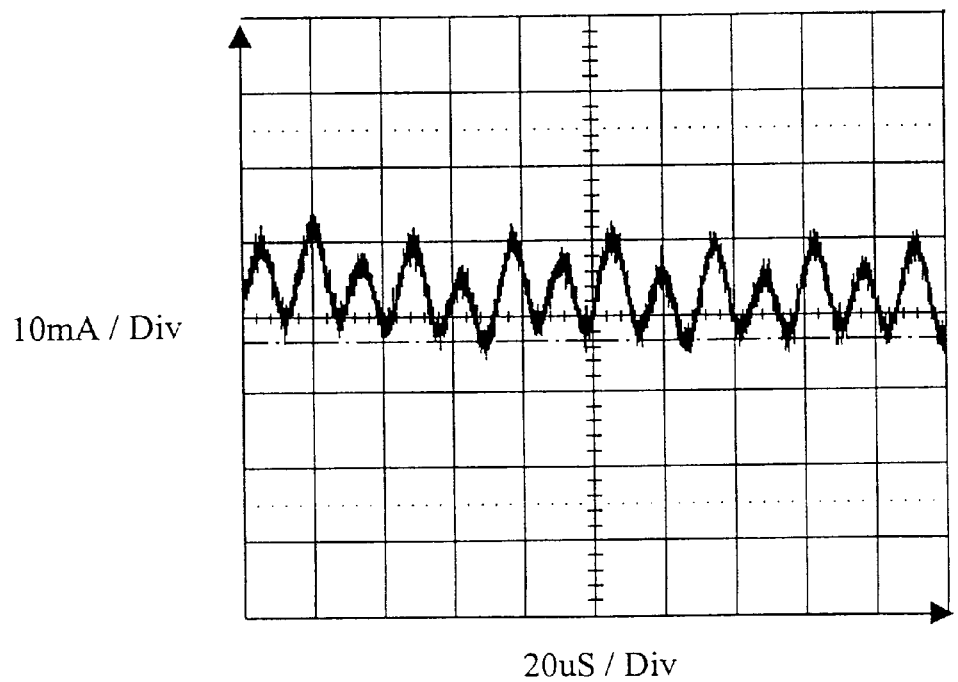
FIG. 8 shows the high frequency ripple content in FIG. 7.

FIG. 7 shows the rectangular lamp current in normal operation. As shown in FIG. 7, the RMS current of the low frequency (approximately 200 Hz in the working example) rectangular lamp current is about 700 mA. FIG. 8 shows the high frequency ripple content in FIG. 7, i.e., a horizontal portion of the waveform of FIG. 7 magnified about 50 times. As shown in FIG. 8, the peak to peak of the high frequency ripple current is about 13 mA(p-p) at approximately 70 KHz operating frequency. Accordingly, as shown in FIG. 8, the ripple ratio is about 1.9%.

FIG. 9 shows the discontinuous operation of the first stage inductance L1 with the present invention and the lamp CDM70/U/M. The measured discontinuous operation of FIG. 9 compares favorably to the discontinuous operation as shown in FIG. 13. FIG. 10 shows the typical measured zero current switching during switch turn-on in the first switching element Q1 or the second switching element Q2 with the present invention and the lamp CDM70/U/M. It can be seen from FIG. 10 that at the time when the gate voltage goes to high, the drain current is zero. This demonstrates zero current switching (ZCS) at turn-on.

Accordingly, as shown in FIGS. 7 and 8, the lamp LMP, during normal operation, is substantially free from acoustic resonance for an alternating rectangular current below approximately 1 KHz rectangular AC operation. Furthermore, the lamp LMP during starting or ignition (shown in FIGS. 5 and 6), may be ignited by an alternating sinusoidal voltage no less than approximately 16 KHz (optionally no less than 20 KHz, and further optionally 40–60 KHz—in the working example, 40–55 KHz). To aid glow-to-arc transition, the lamp LMP is biased by an alternating rectangular voltage no greater than approximately 1 KHz. Optionally, the alternating rectangular voltage is no greater than approximately 200 Hz, and further optionally, is approximately 25 Hz to 200 Hz—in the working example, 25–100 Hz.

Preferably, the alternating rectangular current, during normal operation, is no greater than 1 KHz. Optionally, the alternating rectangular current is no greater than 400 Hz, and further optionally, is about 100–300 Hz (200 Hz in the working example). An alternating rectangular current below approximately 1 KHz is considered suitable in that it would not have acoustic resonance caused by higher order harmonics. The acoustic resonance frequency of HID lamps is usually above approximately 20 KHz. The 20th harmonic of 1 KHz is, of course, 20 KHz, and is very small in magnitude. Even if the 20th harmonic is the same as the acoustic resonance frequency, it will not cause any lamp arc instability because of the small magnitude thereof. The alternating sinusoidal voltage is chosen to be approximately 16 KHz or above, and optionally 20 KHz or above, to reduce the size of the components (L1, L2, C1, and C2). That is, the higher the alternating sinusoidal frequency, the lower the physical size of the components may be. As noted above, an alternating sinusoidal voltage between 40–60 KHz is considered optional, and in the working example, 40 KHz (40–55 KHz range) is used. Below 16 KHz, audible noise begins to be heard.

Thus, the circuit arrangement and control discussed herein ignite a high intensity discharge (HID) lamp, reduce the high frequency ripple superimposed on the low frequency rectangular waveform lamp current after ignition, and increase circuit efficiency. The high frequency ignition voltage is only applied to the lamp LMP during ignition phase and is mainly generated by the second stage of the low pass (LP) filter. The first stage of the LP filter, having a resonant frequency below the second stage, further attenuates the high frequency ripple current through the lamp LMP in normal operation. The resulting lamp current is a low frequency rectangular wave with less than approximately 10% high frequency ripple. In the working example discussed herein, the high frequency ripple is less than 2%. Acoustic resonance is thereby avoided. Moreover, the first stage inductance L1 in the first stage of LP filter is operated in discontinuous current mode. In doing so, the active switching elements Q1 and Q2 are in zero current switching (ZCS) to maximize the circuit efficiency.

Figure 14A:
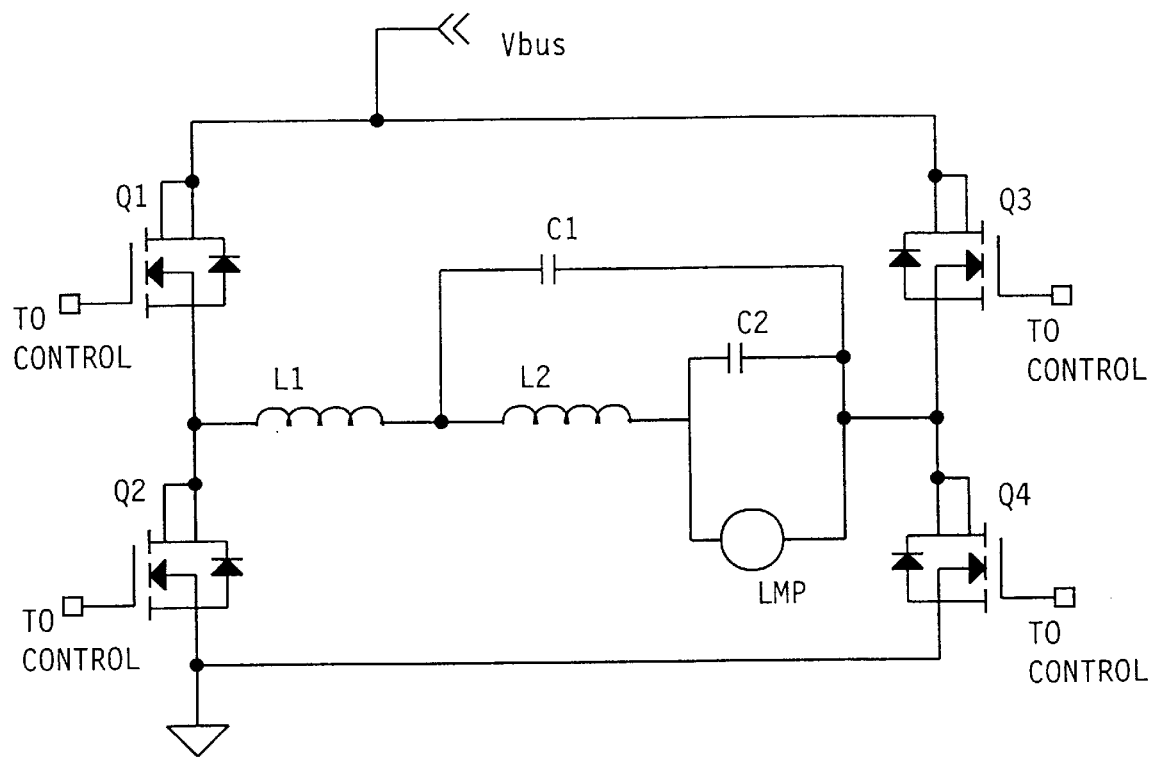
FIG. 14A shows a second embodiment of the invention, substantially corresponding to the circuit of FIG. 3, but in full bridge configuration.
Figure 14B:
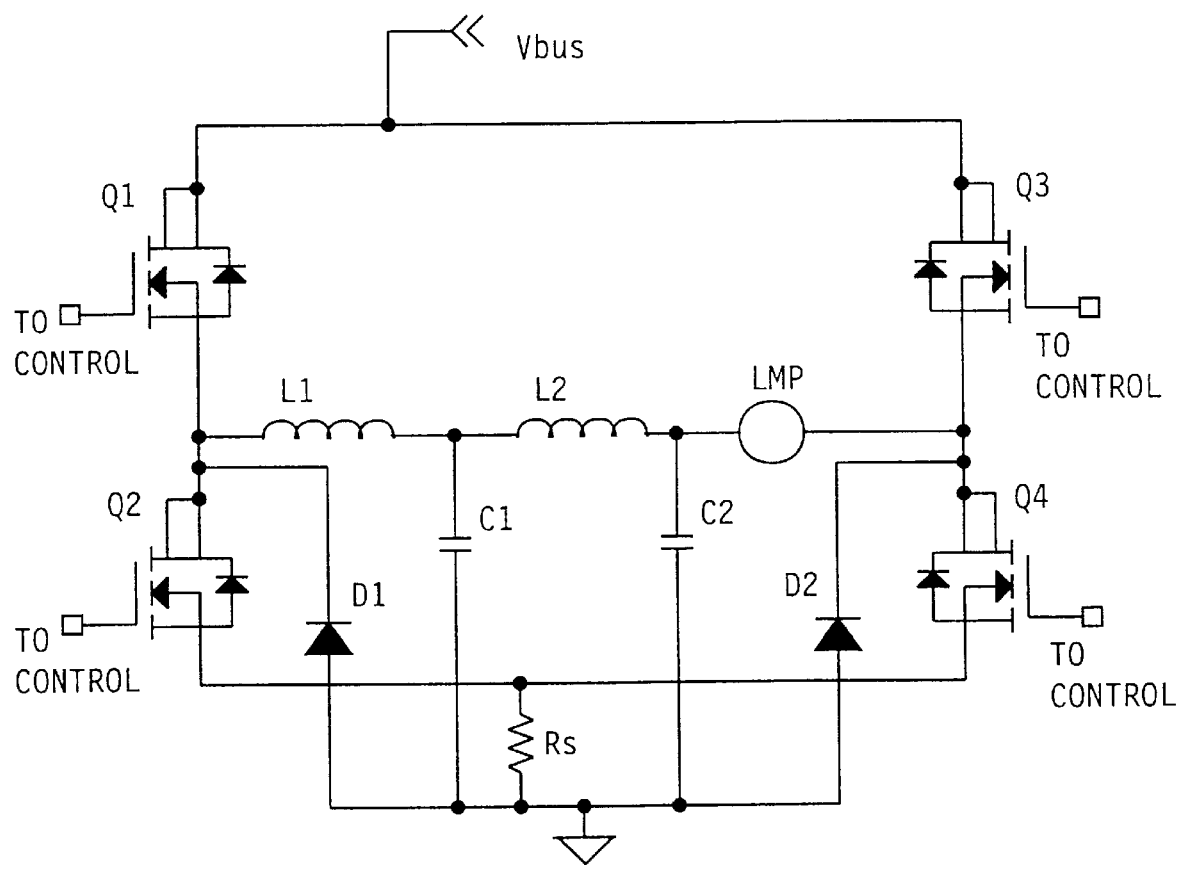
FIG. 14B shows a variation of the full bridge configuration of FIG. 14A.

FIG. 14A shows a second embodiment of the invention, substantially corresponding to the circuit of FIG. 3, but in full bridge configuration. In the alternative topological arrangements shown in FIG. 14A and 14B, the energy storage elements Ca and Cb can be replaced by a pair of active switches Q3 and Q4, forming a full bridge scheme in conjunction with the first switching element Q1 and the second switching element Q2. Accordingly, the switching elements Q1, Q2, Q3, and Q4 are in full bridge configuration. In FIGS. 14A and 14B, the control unit 1 is not shown, but all of the active switches Q1, Q2, 3, and Q4 are connected to the control unit 1 in the manner shown in FIG. 3 with respect to the switching elements Q1 and Q2, and are controlled thereby. In the full bridge configuration shown in FIG. 14A, the lamp current is sensed through the lamp LMP directly, or through the first stage inductance L1 indirectly.

It should be noted that FIGS. 14A and 14B show an arrangement in which the switching elements Q1 and Q2 are high speed MOSFETS incorporating built-in high speed diodes that carry freewheeling current as previously discussed. That is, the switching elements Q1, Q2 and diodes D1 and D2 of the first embodiment (FIG. 3) may be replaced with the high speed MOSFETS, incorporating their own high speed diodes, of the second embodiment of FIG. 14A (also shown in FIG. 14B).

FIG. 14B shows a variation of the full bridge configuration of FIG. 14A. In the variation shown in FIG. 14B, the lamp current is sensed through a detecting resistor Rs (e.g., facilitated by the diodes D1 and D2).

The operation of the full bridge portion of the circuit of FIG. 14A and 14B (e.g., excepting the two-stage filter including L1, C1, L2, C2 and attendant advantages) may be similar to or the same as disclosed in commonly assigned U.S. patent application Ser. No. 08/783,557, filed Jan. 14, 1997, inventor(s) Ajay Maheshwari et al., the disclosure of which is expressly incorporated by reference herein in its entirety. The operation of the two-stage filter of FIGS. 14A and 14B is essentially as disclosed above with respect to the description of the first embodiment.

Although the above description sets forth particular embodiments of the present invention, modifications of the invention will be readily apparent to those skilled in the art, and it is intended that the scope of the invention be determined solely by the appended claims.

What is claimed is:

1. A discharge lamp driving circuit for driving a high intensity discharge lamp, said circuit comprising:

a plurality of DC voltage input connections for powering the discharge lamp driving circuit;

two lamp-driving connections between which the high intensity discharge lamp is connectible;

a bridge circuit connected to said DC voltage input connections, said bridge circuit including high/low frequency driver control circuitry connected to drive switching elements of said bridge circuit, said high/low frequency driver control circuitry igniting the lamp connected between said lamp driving connections by an alternating sinusoidal voltage, biased by an alternating rectangular voltage during starting to aid glow-to-arc transition; and a filter network having at least two filter stages, each of said at least two filter stages being connected to said lamp driving connections and to said switching elements of said bridge circuit to remove acoustic resonance in the lamp during normal operation by filtering an alternating rectangular current driving the lamp.

2. The discharge lamp driving circuit according to claim 1, wherein said alternating sinusoidal voltage is no less than approximately 16 KHz.

3. The discharge lamp driving circuit according to claim 2, wherein said alternating sinusoidal voltage is no less than approximately 20 KHz.

4. The discharge lamp driving circuit according to claim 3, wherein said alternating sinusoidal voltage is approximately 40 KHz to 60 KHz.

5. The discharge lamp driving circuit according to claim 1, wherein said alternating rectangular voltage is no greater than approximately 1 KHz.

6. The discharge lamp driving circuit according to claim 5, wherein said alternating rectangular voltage is no greater than approximately 200 Hz.

7. The discharge lamp driving circuit according to claim 6, wherein said alternating rectangular voltage is approximately 25 Hz to 200 Hz.

8. The discharge lamp driving circuit according to claim 1, wherein said alternating rectangular current is no greater than approximately 1 KHz.

9. The discharge lamp driving circuit according to claim 8, wherein said alternating rectangular current is no greater than approximately 400 Hz.

10. The discharge lamp driving circuit according to claim 9, wherein said alternating rectangular current is approximately 100 Hz to 300 Hz.

11. The discharge lamp driving circuit according to claim 1, wherein said bridge circuit includes a first arm and a second arm, said lamp driving connections include a first lamp driving connection and a second lamp driving connection, and said at least two filter stages form a tank circuit including a first filter stage and a second filter stage, said first filter stage including a resonant circuit having a first stage inductor and a first stage capacitor, said second filter stage including a resonant circuit having a second stage inductor and a second stage capacitor, said first stage inductor being connected between said first arm of said bridge circuit and a first common junction of said first stage capacitor and said second stage inductor, said first stage capacitor being connected between said first common junction and said second arm of said bridge circuit, and said second stage inductor being connected between said first common junction and a second common junction of said first lamp driving connection and said second stage capacitor, said second stage capacitor being connected between said second common junction and said second arm of said bridge circuit, and said second lamp driving connection being connected to the second arm of the bridge circuit.

12. The discharge lamp driving circuit according to claim 11, wherein a second resonant frequency formed by the second stage inductor and the second stage capacitor is higher than a first resonant frequency formed by the first stage inductor and the first stage capacitor.

13. The discharge lamp driving circuit according to claim 11, wherein the capacitance of the first stage capacitor is no less than approximately 10 times the value of the capacitance of the second stage capacitor.

14. The discharge lamp driving circuit according to claim 13, wherein the capacitance of the first stage capacitor is approximately 10–200 times the value of the capacitance of the second stage capacitor.

15. The discharge lamp driving circuit according to claim 14, wherein the capacitance of the first stage capacitor is approximately 15–50 times the value of the capacitance of the second stage capacitor.

16. The discharge lamp driving circuit according to claim 11, wherein the inductance of the second stage inductor is no less than approximately 5 times the value of the inductance of the first stage inductor.

17. The discharge lamp driving circuit according to claim 16, wherein the inductance of the second stage inductor is approximately 5–100 times the value of the inductance of the first stage inductor.

18. The discharge lamp driving circuit according to claim 17, wherein the inductance of the second stage inductor is approximately 10–20 times the value of the inductance of the first stage inductor.

19. The discharge lamp driving circuit according to claim 11, wherein the first stage inductor operates in one of a discontinuous current mode and a critical discontinuous current mode during normal operation after starting.

20. The discharge lamp driving circuit according to claim 11, wherein the second stage inductor operates in a continuous current mode during normal operation after starting.

21. The discharge lamp driving circuit according to claim 11, wherein the second stage inductor is in series with the lamp-discharge connections and the lamp-discharge connections are in parallel with the second stage capacitor, and wherein the second stage capacitor has a capacitance of no less than approximately 0.5 nano-farads.

22. The discharge lamp driving circuit according to claim 21, wherein the second stage capacitor has a capacitance of approximately 0.5 to 10 nano-farads.

23. The discharge lamp driving circuit according to claim 22, wherein the second stage capacitor has a capacitance of approximately 1 to 3 nano-farads.

24. The discharge lamp driving circuit according to claim 11, wherein a switching frequency of the bridge circuit during normal operation is no less than approximately 10 KHz above the first resonant frequency formed by the first stage inductor and the first stage capacitor, and above the second resonant frequency formed by the second stage inductor and the second stage capacitor.

25. The discharge lamp driving circuit according to claim 24, wherein said switching frequency of the bridge circuit during normal operation is approximately 10–80 KHz above the first resonant frequency.

26. The discharge lamp driving circuit according to claim 25, wherein said switching frequency of the bridge circuit during normal operation approximately 20–60 KHz above the first resonant frequency.

27. The discharge lamp driving circuit according to claim 1, wherein the switching elements operate in a zero current switching mode during normal operation.

28. The discharge lamp driving circuit according to claim 1, wherein the switching elements operate in a resonant mode during starting.

29. The discharge lamp driving circuit according to claim 1, wherein the switching elements are in half bridge configuration.

30. The discharge lamp driving circuit according to claim 1, wherein the switching elements are in full bridge configuration.

31. The discharge lamp driving circuit according to claim 11, wherein the control circuitry is connected to sweep the frequency of the AC ignition voltage during starting through a range that includes the second resonant frequency formed by the second stage inductor and the second stage capacitor.

32. The discharge lamp driving circuit according to claim 11, wherein the control circuitry is connected to generate a fixed frequency of the AC ignition voltage during starting above the second resonant frequency formed by the second stage inductor and the second stage capacitor.

33. The discharge lamp driving circuit according to claim 11, wherein the control circuitry is connected to sweep the frequency of the AC ignition voltage during starting through a range having a lower end no less than approximately 5 KHz higher than the first resonant frequency formed by the first stage inductor and the first stage capacitor.

34. The discharge lamp driving circuit according to claim 33, wherein the control circuitry is connected to sweep the frequency of the AC ignition voltage during starting through a range having a lower end approximately 5 KHz to 25 KHz higher than the first resonant frequency formed by the first stage inductor and the first stage capacitor.

35. The discharge lamp driving circuit according to claim 34, wherein the control circuitry is connected to sweep the frequency of the AC ignition voltage during starting through a range having a lower end approximately 10 KHz to 15 KHz higher than the first resonant frequency formed by the first stage inductor and the first stage capacitor.

* * * * *